(12) United States Patent
Uchida et al.

(10) Patent No.: US 8,654,442 B2
(45) Date of Patent: Feb. 18, 2014

(54) REFELCTIVE FRONT SCREEN (75) Inventors: Tatsuo Uchida, Sendai (JP); Yoshito Suzuki, Sendai (JP); Baku Katagiri, Sendai (JP); Toshiaki Hashizume, Suwa (JP); Hiroyuki Shindo, Suwa (JP); Osamu Arakawa, Suwa (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 13/450,051

(22) Filed: Apr. 18, 2012

(65) Prior Publication Data

US 2012/0268814 A1 Oct. 25, 2012

(30) Foreign Application Priority Data

Apr. 22, 2011 (JP) ................................ 2011-095823

(51) Int. Cl.
*G03B 21/60* (2006.01)
(52) U.S. Cl.
USPC .......................................... 359/459; 359/443
(58) Field of Classification Search
CPC ..................................................... G03B 21/60
USPC ................................ 359/459, 443
See application file for complete search history.

(56) References Cited

U.S. PATENT DOCUMENTS

2008/0297895 A1* 12/2008 Fujita et al. ................... 359/459

FOREIGN PATENT DOCUMENTS

JP  B-3563397    9/2004
JP  A-2009-271263  11/2009

* cited by examiner

*Primary Examiner* — Clayton E LaBalle
*Assistant Examiner* — Kevin Butler
(74) *Attorney, Agent, or Firm* — Workman Nydegger (57) ABSTRACT

A screen which reflects light emitted from a projector includes a light diffusion layer through which light incident from a specific angular region is diffused and transmitted and through which light incident from the other angular region is transmitted straight; area pairs having a mirror forming area and a non-mirror forming area; a light transmissive layer having a back surface, on which the area pairs are disposed, and an opposite surface being bonded to a back side of the light diffusion layer; and a specular reflection film formed on a back surface of each mirror forming area. An inclination of the mirror forming area with respect to a normal line of the screen close to the projector becomes larger than the inclination of the mirror forming area far from the projector within a cross section perpendicular to the mirror forming areas inside the screen.

20 Claims, 8 Drawing Sheets

$\theta a1 < \theta a2 < \cdots < \theta an$

REFELCTIVE FRONT SCREEN

BACKGROUND OF THE INVENTION

The present invention relates to a reflective front screen used in a front projection display device.

Priority is claimed on Japanese Patent Application No. 2011-095823, filed Apr. 22, 2011, the contents of which are incorporated herein by reference.

DESCRIPTION OF RELATED ART

Examples of a projection display device include a rear projection display device and a front projection display device. In the case of the rear projection display device, it is necessary to dispose a projector behind a screen. For this reason, a screen cannot be placed on the wall or the window, for example, in order to view images. Accordingly, the rear projection display device is disadvantageous in that it cannot be used efficiently in a limited space, such as a conference room.

In contrast, in the case of the front projection display device, it is possible to place a screen on the wall or the window in order to view images. Accordingly, since a limited space, such as a conference room, can be efficiently used in many cases, use and applications of the front projection display device are rapidly increasing.

In addition, examples of the front projection display device have been introduced in Japanese Patent Publication No. 3563397 and Japanese Unexamined Patent Application, First Publication No. 2009-271263.

The front projection display device has a configuration in which a screen, that is, a reflective front screen is placed substantially vertically and a front projector which projects image light is placed on the front side of the screen.

Moreover, in the related art, as a type of the front projector, generally, a front projector is placed at the position relatively close to the front of the reflective front screen and emits image light to the reflective front screen from there. However, the number of front projectors which are placed diagonally on the lower front side to emit image light to a reflective front screen obliquely upward from there as disclosed in Japanese Unexamined Patent Application, First Publication No. 2009-271263 is increasing.

The reason for the increased number of projectors, each of which is placed diagonally on the lower front side and emits image light to a reflective front screen obliquely upward therefrom is that the projection distance of projector light can be shortened and accordingly, the space can be used more effectively.

On the other hand, when there is outside light which is incident obliquely downward from the top, the reflective front screen absorbs the outside light since the direction of image light emitted from the projector to the reflective front screen is an obliquely upward direction and accordingly, the image light can be easily reflected. This is advantageous in that an image can be displayed with a good contrast even if the indoor lighting is bright. For this reason, the importance of the direction of image light being the obliquely upward direction is increasing.

Specifically, when watching movies, videos, or the like using a projection display device, the lighting may be reduced to make a room dark. However, when it is necessary to refer to the prepared material at hand while watching an image reflected on the screen, and further, to take notes or conduct a face-to-face discussion among persons who gather, or when the projection display device is used for education or the like in schools (various schools including elementary school, middle school, high school, and college), various training, seminars, or the like, it should be possible to see or read materials, textbooks, other texts, prints, or the like or it should be possible to take notes.

In order to do so, the room should be sufficiently brightened with indoor lighting.

In addition, even if the room is bright, an image displayed on the screen should have a sufficient contrast to outside light emitted from the brightness of the room.

Figure 5:
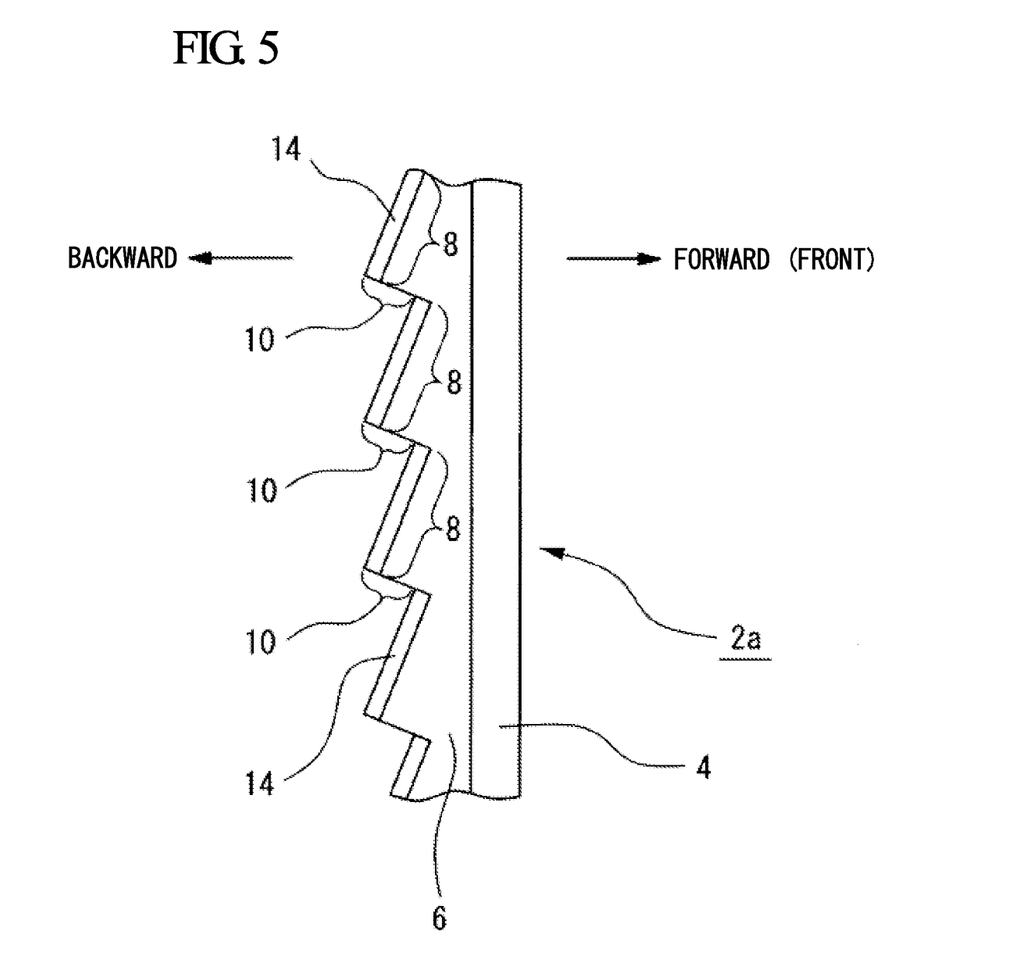
FIG. 5 is a sectional view showing a part of a reflective front screen when the reflective front screen is vertically cut in order to explain the background art.

In addition, a technique which meets such demands and has accomplished outstanding results is disclosed in Japanese Unexamined Patent Application, First Publication No. 2009-271263. FIG. 5 is a vertical sectional view showing an example 2a of a reflective front screen introduced in Japanese Unexamined Patent Application, First Publication No. 2009-271263.

In the front screen 2a shown in FIG. 5, a diffusion plate 4 with a property of making only light incident from the specific angular region diffused and transmitted therethrough and making light incident from the other angular region transmitted straight therethrough is disposed on the front side, and a light transmissive layer 6 with a back surface bent in a sawtooth shape is disposed on the back side of the diffusion plate 4.

Specifically, the back surface of the light transmissive layer 6 bent in the sawtooth shape has a shape in which a mirror forming area 8 with a predetermined inclination and a non-mirror forming area 10 with a different inclination from the predetermined inclination are alternately disposed along the vertical direction. A combination of one mirror forming area 8 and one non-mirror forming area 10 adjacent to the one mirror forming area 8 is assumed to be an area pair in this specification.

A specular reflection film 14 with a specular reflection property is formed in each mirror forming area 8.

The diffusion plate 4 is a diffusion sheet, for example, and is disposed to diffuse image light emitted from the front projector.

That is, the diffusion plate 4 is disposed such that the angle range of image light incident on the diffusion plate 4, either before or after the image light is reflected by the specular reflection film 14, becomes a diffusion angle range.

For example, when the diffusion plate 4 is disposed such that image light is diffused after being reflected by the specular reflection film 14, the diffusion plate 4 has a property of making light incident from the diffusion angle range in the forward direction diffused and transmitted therethrough and making light incident from the other angular range (in the above case, upper and lower places) transmitted straight therethrough.

As an example of such an anisotropic diffusion plate, there is a diffusion film used in Japanese Patent Publication No. 3563397.

The light transmissive layer 6 is formed of resin, for example. The surface of each non-mirror forming area 10 is formed to have a light diffusion property by surface roughening processing.

The specular reflection film is formed of metal, for example, aluminum Al or silver Ag by anisotropic sputtering or the like.

According to the reflective front screen 2a shown in FIG. 5, image light projected from the projector placed diagonally on the lower side is incident on each mirror forming area 8, is reflected forward by the specular reflection film 14 formed in each mirror forming area 8, and is diffused by the diffusion plate 4. As a result, the reflective front screen 2a is viewed by a person who watches it on the front side.

In addition, indoor illumination light or outside light such as sunlight is incident on the reflective front screen 2a obliquely downward. The indoor illumination light or the outside light is transmitted straight through the diffusion plate 4 and is mainly incident on each non-mirror forming area 10.

Since the incident light is diffused on the diffusion plate 4, the incident light cannot be diffused or reflected toward the front side of the reflective front screen 2a.

Such diffusion or reflection of incident light toward the front side can be effectively prevented by providing a refractive index adjusting film or a light absorbing film, which allows transmission of light to the area 10.

Accordingly, the image light is effectively reflected toward the front side of the reflective front screen 2a, and the outside light is absorbed or reflected in a direction other than the front side by the reflective front screen 2a.

Therefore, it is possible to view an image while reading a text or taking notes by displaying a high-contrast image while the lighting is bright.

In this regard, it can be said that the front screen disclosed in Japanese Unexamined Patent Application, First Publication No. 2009-271263 is especially excellent.

Moreover, in the known front screen 2a, the inclinations of the mirror forming areas 8 are the same in all areas of the region located in the uppermost portion of the screen 2a to the area located in the lowermost portion of the screen 2a. Similarly, the inclinations of the non-mirror forming areas are also the same in all areas from the area located in the uppermost portion of the screen to the area located in the lowermost portion of the screen.

From this point of view, the front screen disclosed in Japanese Patent Publication No. 3563397 is the same as the front screen disclosed in Japanese Unexamined Patent Application, First Publication No. 2009-271263.

In the front screen disclosed in Japanese Unexamined Patent Application, First Publication No. 2009-271263, however, there is a problem in that the rate of the area where image light, which occupies the area where a viewer who watches an image is present, is influenced by outside light is high.

This problem will be described with reference to FIGS. 6 to 8.

Figure 6:
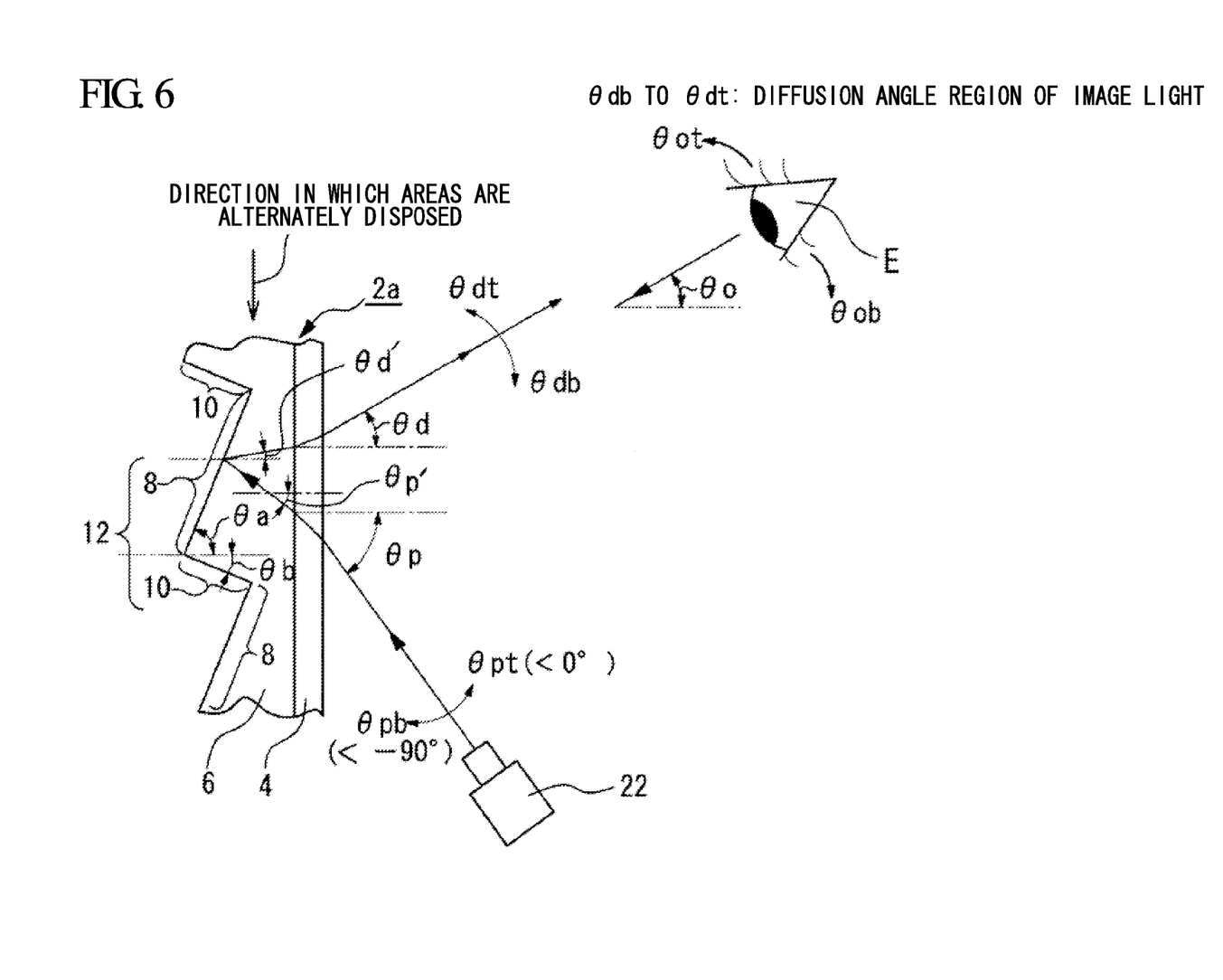
FIG. 6 is a sectional view showing a reflective front screen and a projector therefor when the reflective front screen is vertically cut in order to explain in detail an arrangement angle of the projector, a direction of the optical axis of image light, and the like in the background art.

FIG. 6 is a longitudinal sectional view when a screen for front projection 2a of a front projection display device is cut vertically in order to explain in detail an arrangement angle of the projector 22 with respect to the screen for front projection 2a, a direction of the optical axis of image light, a diffusion angle region, or the like. FIG. 7 is a longitudinal sectional view when the screen for front projection 2a is vertically cut so that the incidence angle allowance region can be seen in further detail.

Figure 7:
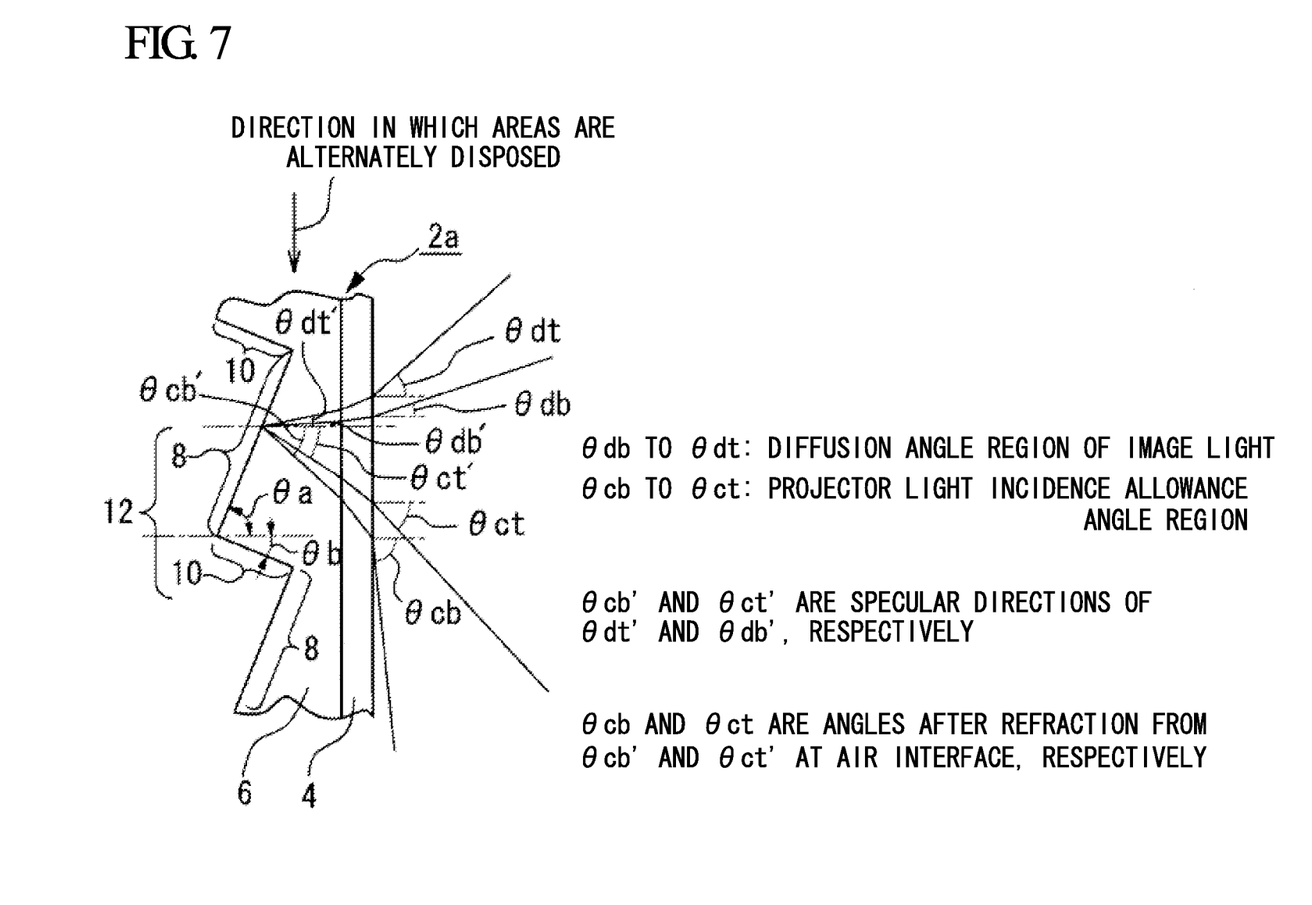
FIG. 7 is a sectional view showing a reflective front screen and a projector therefor when the reflective front screen is vertically cut in order to explain not only the arrangement angle of the projector and the direction of the optical axis of image light but also a diffusion angle region and an incidence allowance angle region in detail regarding the background art.

Moreover, in the screen for front projection 2a shown in FIGS. 6 and 7, only the diffusion layer 4 and the light transmissive layer 6a are shown and other members (portions) are omitted for the sake of convenience.

In FIGS. 6 and 7, a viewer looks down on the screen 2A from above so that the optical path of projector light is easily understood; however, viewers are generally present in the front direction of the screen 2a.

Hereinafter, the definition of angles in all drawings is as follows. A counterclockwise direction is a positive direction, a horizontal plane is 0°, a vertically downward direction is −90°, and a vertically upward direction is 90°.

In FIGS. 6 and 7, $\theta a$ is an angle of the mirror forming area 8 with respect to the normal line (dot-dash line) of the screen (moreover, $\theta a$ is expressed as $\theta 1$ in FIG. 4 in Japanese Unexamined Patent Application, First Publication No. 2009-271263. In drawings of this specification, $\theta a$ is shown for the sake of convenience). $\theta b$ is an angle of the mirror forming area 10 with respect to the normal line (dot-dash line) of the screen (moreover, $\theta b$ is expressed as $\theta 2$ in FIG. 4 in Japanese Unexamined Patent Application, First Publication No. 2009-271263. In drawings of this specification, $\theta b$ is shown for the sake of convenience).

$\theta p$ is an incidence angle of image light which is emitted from the front projector 22 to be incident on the screen for front projection 2a [angle of image light with respect to the normal line (dot-dash line) of the screen]. $\theta pb$ is a lower boundary angle of the incidence angle region of image light emitted from the front projector 22, and $\theta pt$ is an upper boundary angle of the incidence angle region (angle of the boundary closer to outside light).

$\theta p'$ is an angle of image light, which is incident on the screen for front projection 2a, with respect to the normal line of the screen within the light transmissive layer 6.

$\theta d'$ is an angle of image light, which is incident on each mirror forming area 8 and is then reflected by the specular reflection film 14 (not shown in FIG. 6), with respect to the normal line of the screen within the light transmissive layer 6. $\theta d$ is an angle of image light with respect to the normal line of the screen when the image light is transmitted through the light transmissive layer 6 and is emitted to the air after being refracted. $\theta db$ is a lower boundary angle of the diffusion angle region of image light, and $\theta dt$ is an upper boundary angle of the diffusion angle region of image light.

Here, the diffusion angle region of image light is a region where the image light (projector light) is emitted after being diffused and reflected.

For example, when the above components are disposed such that image light is diffused after being reflected in each mirror forming area 8, the diffusion angle region of the image light and the diffusion angle region of the diffusion plate 4 are the same.

On the other hand, when the above components are disposed such that image light is diffused before being reflected in each mirror forming area 8, the diffusion angle region of the image light is the same as a symmetrical region of the diffusion angle region of the diffusion plate 4 with respect to the specular surface of the mirror forming area 8.

$\theta o$ is an angle of the location, at which a viewer E is present, with respect to the normal line of the screen (indicated by the dot-dash line). $\theta ob$ is a lower boundary angle of the observation angle range, and $\theta ot$ is an upper boundary angle of the observation angle range.

In addition, it is assumed that a combination of one mirror forming area 8 and one non-mirror forming area 10 located below the one mirror forming area 8 so as to be adjacent to the one mirror forming area 8 is an area pair and the reference numeral 12 is given to each area pair.

Here, the diffusion angle region will be considered.

In order for a viewer to observe an image, $\theta dt > \theta ot$ and $\theta db < \theta ob$ should be satisfied.

In addition, $\theta pb'$, $\theta pt'$, $\theta db'$, and $\theta dt'$ are defined as follows. $\theta pb'$ is an angle of image light, which is incident on the light transmissive layer 6 from the air at the lower boundary (lower limit) angle $\theta pb$ of the incidence angle region, with respect to the normal line of the screen within the light transmissive layer 6. $\theta pt'$ is an angle of image light, which is incident on the light transmissive layer 6 from the air at the upper boundary (upper limit) angle $\theta pt$, with respect to the normal line of the screen within the light transmissive layer 6. $\theta db'$ is an angle of a virtual beam, which is incident on the light transmissive layer 6 from the air at the lower boundary angle $\theta db$ of the diffusion angle region of the image light, with respect to the normal line of the screen within the light transmissive layer 6. θdt' is an angle of a virtual beam, which is incident on the light transmissive layer 6 from the air at the upper boundary angle θdt of the diffusion angle region of the image light, with respect to the normal line of the screen within the light transmissive layer 6.

In this case, preferably, upper and lower limits θamax and θamin of the angle θa, that is, the angle of the mirror forming area 8 with respect to the normal line (dot-dash line) of the screen satisfy the conditions expressed by the following Expression.

$$\theta a\max=[(\theta pt'+\theta dt')/2]+90°$$

$$\theta a\min=[(\theta pb'+\theta db')/2]+90°$$

This is because image light within the incidence angle range emitted from the front projector 22 is not incident on the diffusion angle region of the diffusion plate 4 if the above conditions are not satisfied.

However, some projector light beams may not be effectively reflected to become useless inevitably for the convenience of design or production.

Also in such a case, it is preferable that at least 50% of light incident from the incidence angle region of the front projector be reflected toward the diffusion angle region.

In addition, it is preferable that θdb be larger than θpt. That is, θpt<θdb is preferable.

This is because, if θdb is not larger than θpt, that is, if θpt>θdb, the incidence angle region of image light traveling obliquely upward from the front projector 22 and the diffusion angle region of the image light overlap each other and accordingly cannot be satisfactorily displayed.

In addition, it is preferable that θb be larger than θpt'−20°. That is, θb>θpt'−20° is preferable.

First, this is because, if θb is set to be equal to or larger than θpt', there is no possibility that image light emitted from the front projector 22 will be incident on the non-mirror forming area 10 and accordingly the loss of image light can be completely eliminated.

Next, this is because, even if θb is smaller than θpt', the loss of image light can be extremely reduced if the difference is about 20°.

In addition, the preferable conditions described above are satisfied even if the position in the horizontal direction is set to be different.

Until now, the case has been assumed in which projector light emitted from the place below the screen is incident and the projector light is observed from the front. However, the same theory may also be applied to a case, in which projector light emitted from the place above the screen is incident and the projector light is observed from the front, by taking the vertically reversed coordinates.

In addition, the same theory may also be applied even if the coordinates are taken in left and right directions or diagonally instead of taking the vertically reversed coordinates.

Incidentally, in the related art, θa, that is, the angle of the mirror forming area 8 with respect to the normal line (dot-dash line) of the screen is the same for all areas 8 of the mirror forming area 8 located at the upper end of the screen 2a to the mirror forming area 8 located at the lower end.

For this reason, there is a problem in that at least part of the entire screen 2a is influenced by outside light and accordingly the visible observation position becomes wide.

In order to explain this, it is necessary to define a region where the incidence of projector light is allowed (hereinafter, referred to as a projector light incidence allowance angle region). FIG. 7 is an explanatory view showing the region.

In FIG. 7, θcb' is an angle of a virtual beam, which is incident on the mirror forming area 8 at the angle θdt' and is then reflected therefrom, with respect to the normal line of the screen within the light transmissive layer 6, and θct' is an angle of a virtual beam, which is incident on the mirror forming area 8 at the angle θdb' and is then reflected therefrom, with respect to the normal line of the screen within the light transmissive layer 6.

In addition, θct is an angle of a virtual beam, which is emitted from the light transmissive layer 6 to the air after being refracted at the angle θct', with respect to the normal line of the screen, and θb is an angle of a virtual beam, which is emitted from the light transmissive layer 6 to the air after being refracted at the angle θcb', with respect to the normal line of the screen.

In this case, the projector light incidence allowance angle region is defined to be equal to or larger than θcb and equal to or smaller than θct.

Light incident from the projector light incidence allowance angle region is reflected toward the diffusion angle region of the diffusion plate 4 by the mirror forming area 8 and is then diffused and reflected in a direction of a viewer regardless of whether the light is projector light or outside light.

Undoubtedly, the projector light should be incident from the projector light incidence allowance angle region, and the following conditions should be satisfied.

$$\theta cb<\theta pb, \theta pb<\theta ct$$

The above Expressions regarding θamax and θamin are Expressions which describe the above conditions as conditions for the angle θa of the mirror forming area 8 with respect to the normal line (dot-dash line) of the screen. These are in essence the same conditions.

Figure 8:
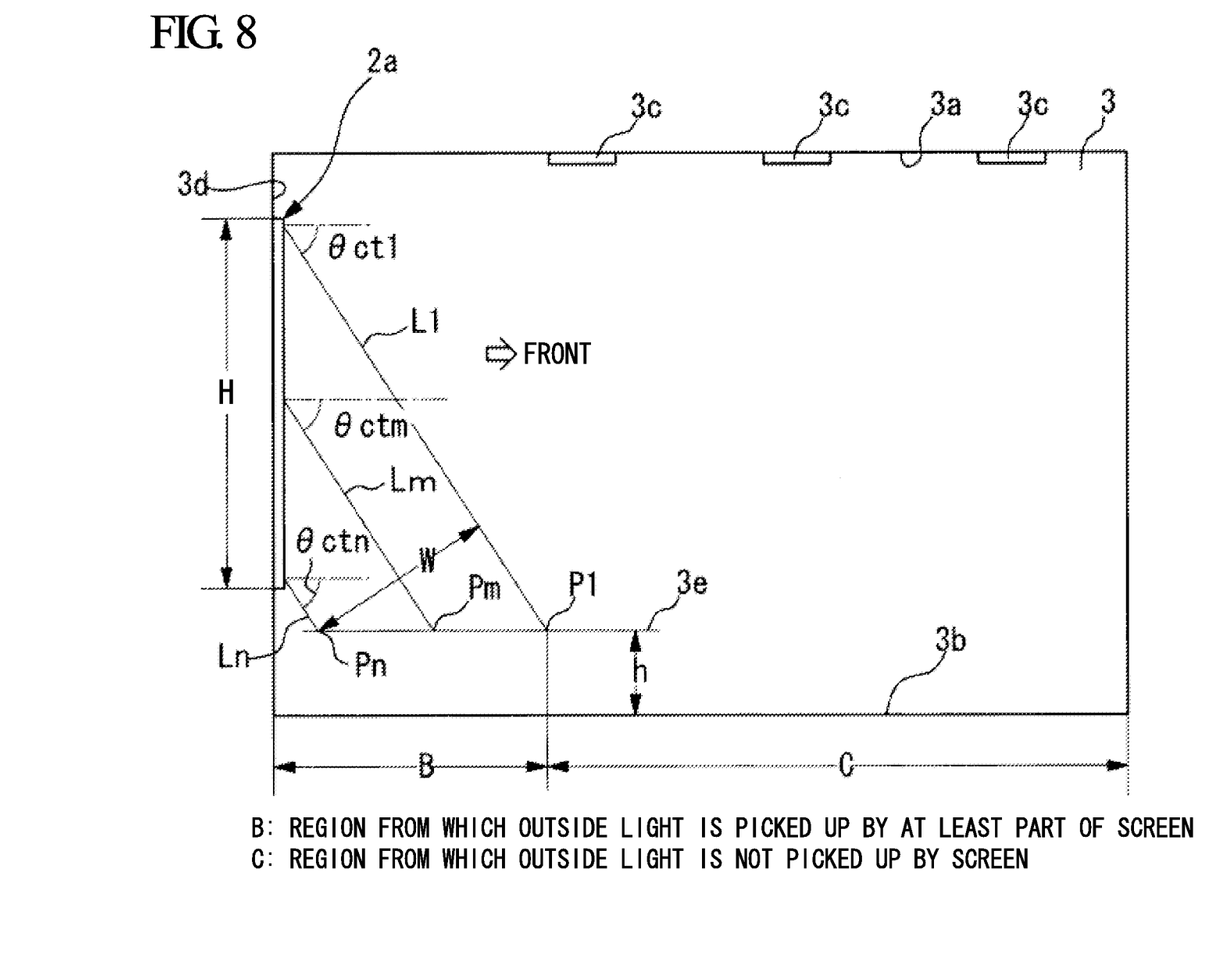
FIG. 8 is a sectional view showing a known example of a reflective front screen in a room where a display device is installed in order to explain a problem to be solved by the invention.

Next, based on the projector light incidence allowance angle, a region where an image is viewed in a state influenced by outside light is shown in FIG. 8.

In FIG. 8, 3 indicates a room where the screen 2a is installed on one inner wall, 3a indicates the ceiling of the room 3, 3b indicates the floor of the room 3, 3c indicates the lighting installed on the ceiling 3a of the room 3, 3d indicates a screen installation wall on which the screen 2a is installed, and 3e is a horizontal plane where a projector is installed. Specifically, 3e is a horizontal plane located at the height h, where a projector is installed, from the floor 3b.

H is a vertical length (height) of the almost vertical screen 2a. θct1 is an upper boundary angle (angle of the boundary closer to outside light) θct of the projector light incidence allowance angle region in the mirror forming area 8 located at the highest position among the mirror forming areas 8 of the screen 2a.

θctm is an upper boundary angle (angle of the boundary closer to outside light) of the projector light incidence allowance angle region in the mirror forming area 8 located in the middle of the mirror forming areas 8 of the screen 2a in the height direction.

In addition, θctn is an upper boundary angle (angle of the boundary closer to outside light) of the projector light incidence allowance angle region in the mirror forming area 8 located at the lowest position among the mirror forming areas 8 of the screen 2a.

That is, numbers 1, 2, . . . are given to the areas 8 in order from the top. The last number of the area is set to n, and the middle number is set to m. These numbers are given as subscripts in order to indicate an upper boundary angle of the projector light incidence allowance angle region in the mirror forming area 8 located at a certain height.

In addition, as described above, θcb is a lower boundary angle (angle of the boundary far from outside light) of the projector light incidence allowance angle region from the front projector 22.

Incidentally, in the related art, the inclination angle θa of the mirror forming area 8 (refer to FIGS. 6 and 7) of the screen 2*a* located at the high position, the inclination angle θa of the mirror forming area 8 located in the middle, and the inclination angle θa of the mirror forming area 8 located at the low position are the same. Accordingly, all upper boundary angles θct1, θct2, . . . , θctm of projector light incidence allowance angle regions of the mirror forming areas 8 are the same.

In FIG. 8, L1 is a line of a virtual beam which travels in a direction of the upper boundary angle θct1 of the projector light incidence allowance angle region in the highest mirror forming area 8 with the highest mirror forming area 8 as a starting point, and the point of intersection between the line L1 and the horizontal plane 3*e* of the room 3 where the projector is installed is P1.

A region C after the point of intersection P1 (in a direction away from the screen) becomes a region from which outside light is not picked up by the screen 2*a* when an outside light source is present there.

In addition, a region B from the point of intersection P1 to the installation position (inner wall) of the screen 2*a* before the point of intersection P1 (in a direction becoming closer to the screen) becomes a region from which outside light is picked up by at least a part of the screen 2*a* when the outside light source is present there.

In addition, Ln is a line of a virtual beam which travels in a direction of the upper boundary angle θctn of the projector light incidence allowance angle region in the lowest mirror forming area 8 with the lowest mirror forming area 8 as a starting point, and the point of intersection between the line Ln and the horizontal plane 3*e* of the room 3 where the projector is installed is Pn.

In addition, Lm is a line of a virtual beam which travels in a direction of the upper boundary angle θctm of the projector light incidence allowance angle region in the middle mirror forming area 8 with the middle mirror forming area 8 as a starting point, and the point of intersection between the line (line of a virtual beam) Lm and the horizontal plane 3*e* of the room 3 where the projector is installed is Pm.

On the other hand, it is preferable that an outside light source be not present in the region B in order to view (observe) an image displayed on the screen 2*a*.

This is because the region B is a projector light incidence allowance angle region for at least a part of the screen, outside light emitted from the outside light source located in the region B is diffused and reflected in a viewer direction by the screen 2*a*, and this outside light interferes with a display image.

In the related art, however, the length of the region B (distance of the point of intersection P1 from the installation wall 3*d* of the screen 2*a*) is large. Therefore, in the related art, there has been a problem in that the relatively wide region B is made in a front portion (portion close to the screen 2*a*) of the room 3 and outside light existing in the region interferes with a display image.

In FIG. 8, W is a line width, the line being perpendicular to the line L1 of a virtual beam and connecting the line L1 with the point of intersection Pn, and is "height H of a screen×cos θct1 (~θctn)". This is exactly the diameter of a circle with a minimum diameter through which all virtual beams L1 to Ln pass. In the related art, this size has determined the length of the region B.

SUMMARY OF THE INVENTION

The invention has been made to solve such problems, and it is an object of the invention to narrow a region, which is located on the front side of a reflective front screen and in which there exists outside light interfering with a display image, and to widen a region, in which there is no outside light that can have an adverse effect on a display image, in a room where a screen is installed.

A reflective front screen which reflects light emitted from a front projector of a first aspect of the invention includes a light diffusion layer through which only light incident from a specific angular region is diffused and transmitted and through which light incident from the other angular region is transmitted straight; area pairs having a mirror forming area with a predetermined inclination and a non-mirror forming area with a different inclination from the predetermined inclination, the mirror forming area and the non-mirror forming area being alternately disposed along a predetermined direction and being bent in a sawtooth shape; a light transmissive layer having a back surface, on which the area pairs are disposed, and an opposite surface to the back surface, the opposite surface being bonded to a back side of the light diffusion layer; and a specular reflection film which is formed on a back surface of each mirror forming area and is formed of a material with reflectivity. Furthermore, an inclination of the mirror forming area with respect to a normal line of the screen close to the front projector becomes larger than the inclination of the mirror forming area far from the front projector within a cross section perpendicular to the mirror forming areas inside the screen.

A reflective front screen which reflects light emitted from a front projection display device of a second aspect of the invention includes a light diffusion layer through which only light incident from a specific angular region is diffused and transmitted and through which light incident from the other angular region is transmitted straight; and a specular reflection portion formed at a position to which the light emitted from the front projection display device and transmitted through the light diffusion layer is incident, the specular reflection portion having a predetermined inclination with respect to a normal line of the screen, and the specular reflection portion being formed of a material with reflectivity. Furthermore, an inclination of the specular reflection portion with respect to the normal line of the screen close to the display device becomes larger than the inclination of the inclination of the specular reflection portion far from the display device within a cross section perpendicular to the specular reflection portion inside the screen.

In the reflective front screen of the second aspect of the invention, it is preferable that further include a light transmissive layer having a back surface, on which a mirror forming area with a predetermined inclination is formed, and an opposite surface to the back surface, the opposite surface being bonded to a back side of the light diffusion layer. Furthermore it is preferable that the specular reflection portion be formed in the mirror forming area.

In the reflective front screen of the second aspect of the invention, it is preferable that non-mirror forming area with different predetermined inclination from the inclination of the mirror forming area be further formed on the back surface of the light transmissive layer.

In the reflective front screen of the second aspect of the invention, it is preferable that a surface on which the mirror forming area and the non-mirror forming area be alternately disposed along a predetermined direction and which are bent in a sawtooth shape is formed as the back surface of the light transmissive layer.

In the reflective front screen of the second aspect of the invention, it is preferable that the inclination of the specular reflection portion with respect to the normal line of the screen change continuously.

In the reflective front screen of the second aspect of the invention, it is preferable that virtual lines extending from all of the specular reflection portions in a direction of a light incidence allowance angle of light emitted from the display device, which is determined by the inclination of each of the specular reflection portions and a diffusion characteristic of the light diffusion layer, substantially intersect at one point.

In the reflective front screen of the second aspect of the invention, it is preferable that virtual lines extending from all of the specular reflection portions in a direction of a light incidence allowance angle of light emitted from the display device, which is determined by the inclination of each of the specular reflection portions and a diffusion characteristic of the light diffusion layer, pass through a point near a projection opening of the display device.

In the reflective front screen of the second aspect of the invention, it is preferable that a diameter of a circle with a minimum diameter through which all virtual lines extending from all of the specular reflection portions in a direction of a light incidence allowance angle of light emitted from the display device, which is determined by the inclination of each of the specular reflection portions and a diffusion characteristic of the light diffusion layer, pass be approximately 0.

In the reflective front screen of the second aspect of the invention, it is preferable that the inclination of the specular reflection portion with respect to the normal line of the screen change in a stepwise manner.

In the reflective front screen of the second aspect of the invention, it is preferable that image light emitted from the display device placed diagonally on a lower front side of the screen be reflected toward a viewer located on the front side.

A reflective front screen which reflects light emitted from a front projection display device of a third aspect of the invention includes a light diffusion layer through which only light incident from a specific angular region is diffused and transmitted and through which light incident from the other angular region is transmitted straight; and a specular reflection portion which is formed at a position where the light emitted from the front projection display device transmitted through the light diffusion layer is incident, has a predetermined inclination with respect to a normal line of the screen, and is formed of a material with reflectivity. Furthermore, the specular reflection portion includes a first specular reflection portion and a second specular reflection portion, the second reflection portion located closer to the display device than the first specular reflection portion within a cross section perpendicular to the specular reflection portion inside the screen, and the inclination of the second specular reflection portion with respect to the normal line of the screen is larger than the inclination of the first specular reflection portion with respect to the normal line of the screen.

In the reflective front screen of the third aspect of the invention, it is preferable that the reflective front screen further comprising: a light transmissive layer having a back surface, on which a mirror forming area with a predetermined inclination is formed, and an opposite surface to the back surface, the opposite surface being bonded to a back side of the light diffusion layer. Furthermore, it is preferable that the specular reflection portion be formed in the mirror forming area.

In the reflective front screen of the third aspect of the invention, it is preferable that a non-mirror forming area with a different predetermined inclination from the inclination of the mirror forming area be further formed on the back surface of the light transmissive layer.

In the reflective front screen of the third aspect of the invention, it is preferable that a surface on which the mirror forming area and the non-mirror forming area are alternately disposed along a predetermined direction and which are bent in a sawtooth shape be formed as the back surface of the light transmissive layer.

In the reflective front screen of the third aspect of the invention, it is preferable that the specular reflection portion further include the specular reflection portion further includes a third specular reflection portion which is located closer to the display device within the cross section perpendicular to the specular reflection portion inside the screen than the first specular reflection portion, the third reflection portion is located farther from the display device within the cross section perpendicular to the specular reflection portion inside the screen than the second specular reflection portion and the inclination of the third specular reflection with respect to the normal line of the screen is larger than the inclination of the first specular reflection portion with respect to the normal line of the screen and smaller than the inclination of the second specular reflection portion with respect to the normal line of the screen.

In the reflective front screen of the third aspect of the invention, it is preferable that a first virtual line extending from the first specular reflection portion in a direction of a light incidence allowance angle of light emitted from the display device that is determined by the inclination of the first specular reflection portion and a diffusion characteristic of the light diffusion layer, a second virtual line extending from the second specular reflection portion in a direction of a light incidence allowance angle of light emitted from the display device that is determined by the inclination of the second specular reflection portion and the diffusion characteristic of the light diffusion layer, and a third virtual line extending from the third specular reflection portion in a direction of a light incidence allowance angle of light emitted from the display device that is determined by the inclination of the third specular reflection portion and the diffusion characteristic of the light diffusion layer substantially intersect at one point.

In the reflective front screen of the third aspect of the invention, it is preferable that a first virtual line extending from the first specular reflection portion in a direction of a light incidence allowance angle of light emitted from the display device that is determined by the inclination of the first specular reflection portion and a diffusion characteristic of the light diffusion layer, a second virtual line extending from the second specular reflection portion in a direction of a light incidence allowance angle of light emitted from the display device that is determined by the inclination of the second specular reflection portion and the diffusion characteristic of the light diffusion layer, and a third virtual line extending from the third specular reflection portion in a direction of a light incidence allowance angle of light emitted from the display device that is determined by the inclination of the third specular reflection portion and the diffusion characteristic of the light diffusion layer pass through a point near a projection opening of the display device.

In the reflective front screen of the third aspect of the invention, it is preferable that the specular reflection portion further includes a fourth specular reflection portion which is located closer to the display device within the cross section perpendicular to the specular reflection portion inside the screen than the first specular reflection portion, the fourth specular reflection portion is located farther from the display device than the second specular reflection portion within the cross section perpendicular to the specular reflection portion inside the screen and the inclination of the fourth specular reflection portion with respect to the normal line of the screen is equal to the inclination of the second specular reflection portion with respect to the normal line of the screen.

In the reflective front screen of the third aspect of the invention, it is preferable that image light emitted from the display device placed diagonally on a lower front side of the screen be reflected toward a viewer located on the front side.

In a reflective front screen according to an aspect of the invention, the inclination of a mirror forming area with respect to the normal line of a screen changes such that the inclination of a mirror forming area close to a projector becomes larger than the inclination of a mirror forming area far from the projector within the cross section perpendicular to the mirror forming areas inside the screen. Accordingly, in FIG. 8, it is possible to make smaller the region B from which outside light is picked up by at least a part of the screen on the front side of the screen 2a. As a result, the region C from which outside light is not picked up by the screen can be made long.

This is just making the width W of the diameter of a circle with a minimum diameter, through which virtual beam lines of all area pairs of the screen pass, smaller than the "height H of a screen×cos θct1".

That is, if the width W is a value smaller than the "height H of a screen×cos θct1", for example, "0.8×H×cos θct1", the effects of the invention can be achieved.

In addition, although each of the mirror forming area and the non-mirror forming area generally has a shape extending straight in the horizontal direction when seen from the front side of the screen, each of the mirror forming area and the non-mirror forming area may have an arc shape when seen from the front side of the screen.

DETAILED DESCRIPTION OF THE INVENTION

In the same manner as in the known example 2a shown in FIG. 5, a reflective front screen of the invention includes a diffusion plate (a light diffusion layer) 4 with a property of making only light incident from the specific angular region (a first angular region) diffused and transmitted therethrough and making light incident from the other angular region (a second angular region) transmitted straight therethrough, and a light transmissive layer 6 with a back surface bent in a sawtooth shape, the diffusion plate 4 disposed on the front side, and the light transmissive layer 6 disposed on the back side of the diffusion plate 4.

In addition, the back surface of the light transmissive layer 6 bent in the sawtooth shape has a shape in which a mirror forming area 8 with a predetermined inclination and a non-mirror forming area 10 with a different inclination from the predetermined inclination are alternately disposed along the vertical direction. A combination of one mirror forming area 8 and one non-mirror forming area 10 adjacent to the one mirror forming area 8 is assumed to be an area pair in this specification. Furthermore, a specular reflection film 14 with a specular reflection property is formed in each mirror forming area 8.

Basically, the invention is characterized in that the inclination of a mirror forming area with respect to the normal line of a screen changes such that the inclination of a mirror forming area close to a projector becomes larger than the inclination of a mirror forming area far from the projector within the cross section perpendicular to the mirror forming areas inside the screen. In this case, the diameter of a circle with a minimum diameter through which a virtual beam line, which indicates an upper boundary angle θct of a projector light incidence allowance angle region in all area pairs of the screen, passes can be made smaller than the "height H of a screen×cos θct1". As a result, the region B (refer to FIG. 8) can be made smaller than in the related art. However, the inclination of the mirror forming area with respect to the normal line of the screen may change in a stepwise manner or may change in a continuous manner (in a non-stepwise manner).

The stepwise manner means that the screen is vertically divided into a plurality of division areas extending in the horizontal direction, the inclination θa of the minor forming area with respect to the normal line of the screen in each division area is the same but the inclination θa differs with each division area, and the inclination θa of the mirror forming area in the division area close to the projector is set to be larger than the inclination θa of the mirror forming area in the division area far from the projector.

The continuous manner (non-stepwise manner) means that the screen is not vertically divided into a plurality of division areas extending in the horizontal direction and the inclination θa of the mirror forming area close to the projector is set to be larger than the inclination θa of the mirror forming area far from the projector.

In addition, the invention may be applied to both a reflective front screen used in the use conditions where image light emitted from a projector is emitted diagonally from the lower front side (floor side) of the screen, the image is displayed for a viewer located on the front side, and the lighting as outside light is placed on the ceiling side and a reflective front screen used in the use conditions where image light emitted from a projector is emitted diagonally from the upper front side (ceiling side) of the screen, the image is displayed for a viewer located on the front side, and the lighting as outside light is placed on the floor side.

In the former case, there is a need to take the coordinates as described up to now. In the latter case, there is a need to take the coordinates by reversing the definition of positive and negative angles in the vertical section.

First Embodiment

Hereinafter, an embodiment of the invention will be described in detail with reference to the accompanying drawings.

Figure 1:
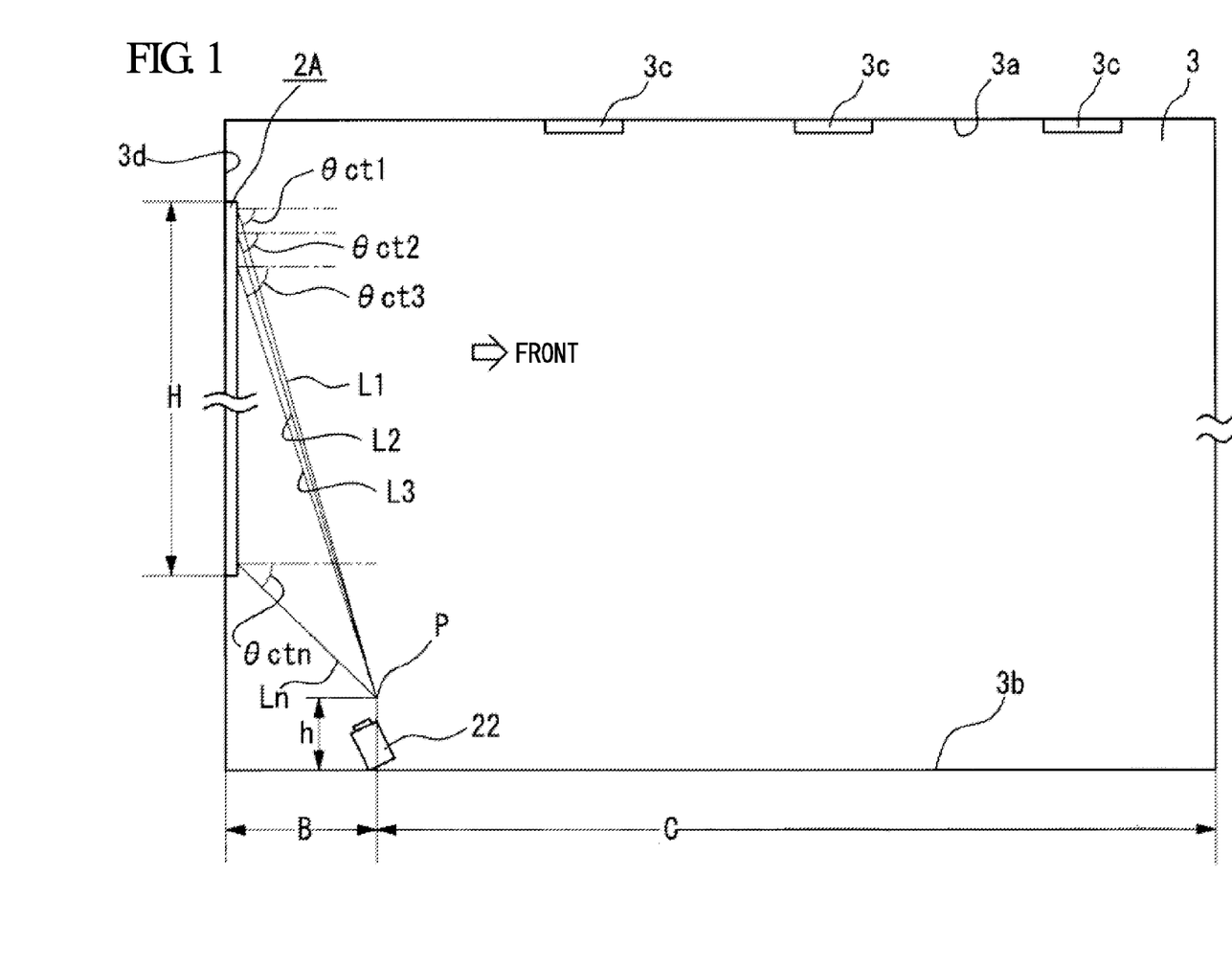
FIG. 1 is a schematic longitudinal sectional view of a reflective front screen in a room where a display device is installed, which shows a first embodiment (embodiment 2A) of the invention.
Figure 2:
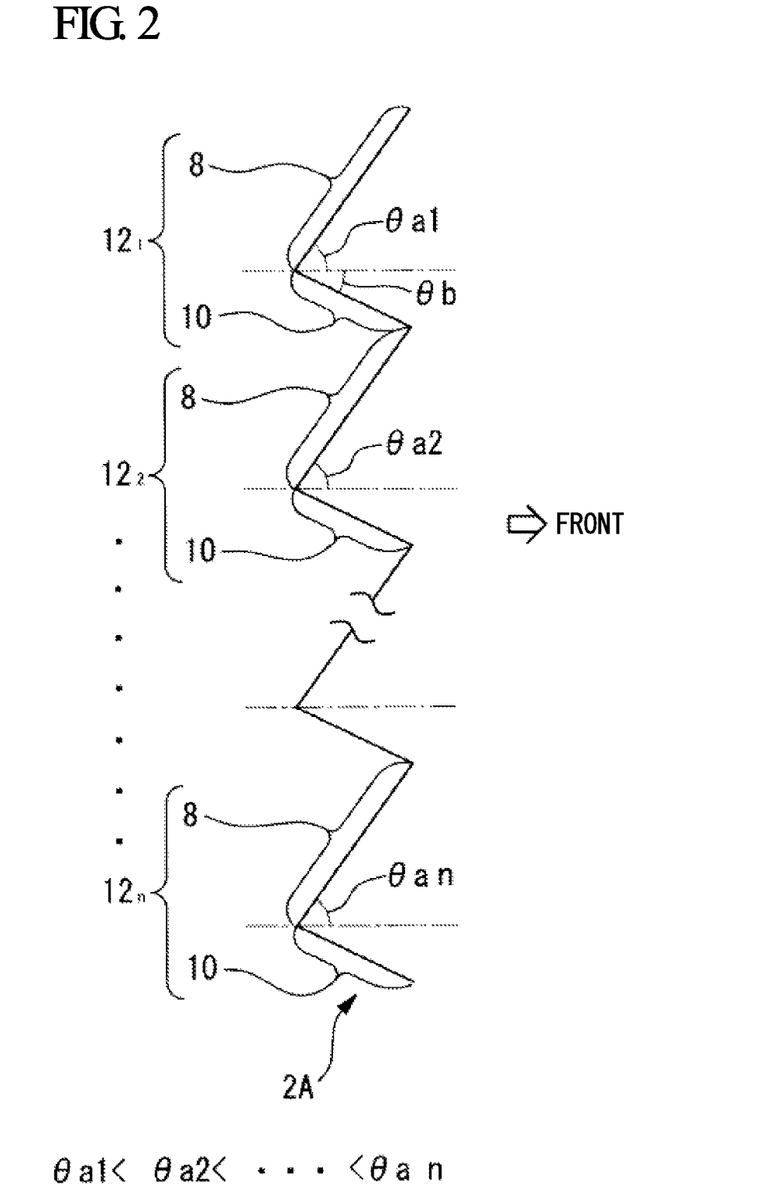
FIG. 2 is a longitudinal sectional view showing a mirror forming area 8 and a non-mirror forming area 10 of a screen 2A, which shows the first embodiment (embodiment 2 A) of the invention.

FIGS. 1 and 2 show a first embodiment (embodiment 2A) of the invention. FIG. 1 is a schematic longitudinal sectional view of a reflective front screen in a room where a display device is installed, and FIG. 2 is a longitudinal sectional view showing a mirror forming area 8 and a non-mirror forming area 10 of a screen 2A.

A reflective front screen 2A according to the present embodiment is largely different from that in the related art in that the angle θa of the mirror forming area 8 with respect to the normal line of the screen becomes large gradually as a combination (area pair) 12 of one mirror forming area 8 and the non-mirror forming area 10 adjacent thereto moves downward from the top.

However, since the reflective front screen 2A according to the present embodiment has basically the same structure except for the above point, an additional drawing for the reflective front screen 2A is not provided, and the same reference numerals as in FIGS. 5 to 8 are also used in FIGS. 1 and 2 to indicate the same portions.

In addition, only a different point from those described already in the known example will be described for the present embodiment, and the same explanation as in the known example will be omitted if possible.

The same is true for second and third embodiments described later (embodiments 2B and 2C).

In the same manner as in the known example 2a shown in FIG. 5, the screen 2A is used in the use conditions where image light emitted from a projector is emitted diagonally from the lower front side (floor side) of the screen, the image is displayed for a viewer located on the front side, and the lighting as outside light is placed on the ceiling side.

As shown in FIG. 2, the feature of the present embodiment 2A is that the inclination θa of the mirror forming area 8 with respect to the normal line of the screen increases gradually from the highest area pair 12 to the lowest area pair 12 among the area pairs 12 each of which is a combination of one mirror forming area 8 and the non-mirror forming area 10 adjacent thereto.

Specifically, when the number of the area pair from the top is added to the angle θa as a subscript, that is, assuming that the angle θa of the first area pair 12 from the top is θa1, the angle θa of the second area pair 12 is θa2, and the angle θa of the n-th area pair 12 is θan, the relationship of the angle θa of each area pair 12 is expressed by the following Expression.

$$\theta a1 < \theta a2 < \theta a3 \cdots < \theta an$$

This relationship of $\theta a1 < \theta a2 < \theta a3 \cdots < \theta an$ is set such that the lines L1 to Ln of the upper boundary angles θct1, θct2, . . . , θctn of the incidence angle regions of the mirror forming areas 8 of the area pairs 121 to 12n pass through the point P near the projection opening (lens) of the projector 22, as shown in FIG. 1.

In addition, θct1, θct2, . . . , θctn indicate θct of the area pairs 121 to 12n, and FIG. 7 is referred to for the θct.

In the present embodiment 2A, therefore, the diameter W of a circle with a minimum diameter through which the virtual beam lines L1 to Ln of all area pairs 121 to 12n pass becomes approximately 0. As a result, it is possible to narrow the region B, which is located on the front side of the reflective front screen and in which there exists outside light interfering with a display image, and to widen the region C, which is located on the front side of the reflective front screen and in which there is no outside light that can have an adverse effect on a display image.

In addition, projector light should be incident on the positions corresponding to the area pairs 121 to 12n of the screen 2A at angles equal to or smaller than θct1, θct2, . . . , θctn. Accordingly, the projection opening (lens) of the projector 22 should be located in a direction of an angle equal to or smaller than the above angle from the point P (position at which the diameter W of a circle with a minimum diameter through which the virtual beam lines L1 to Ln pass becomes approximately 0) when seen from the screen.

Second Embodiment

Figure 3:
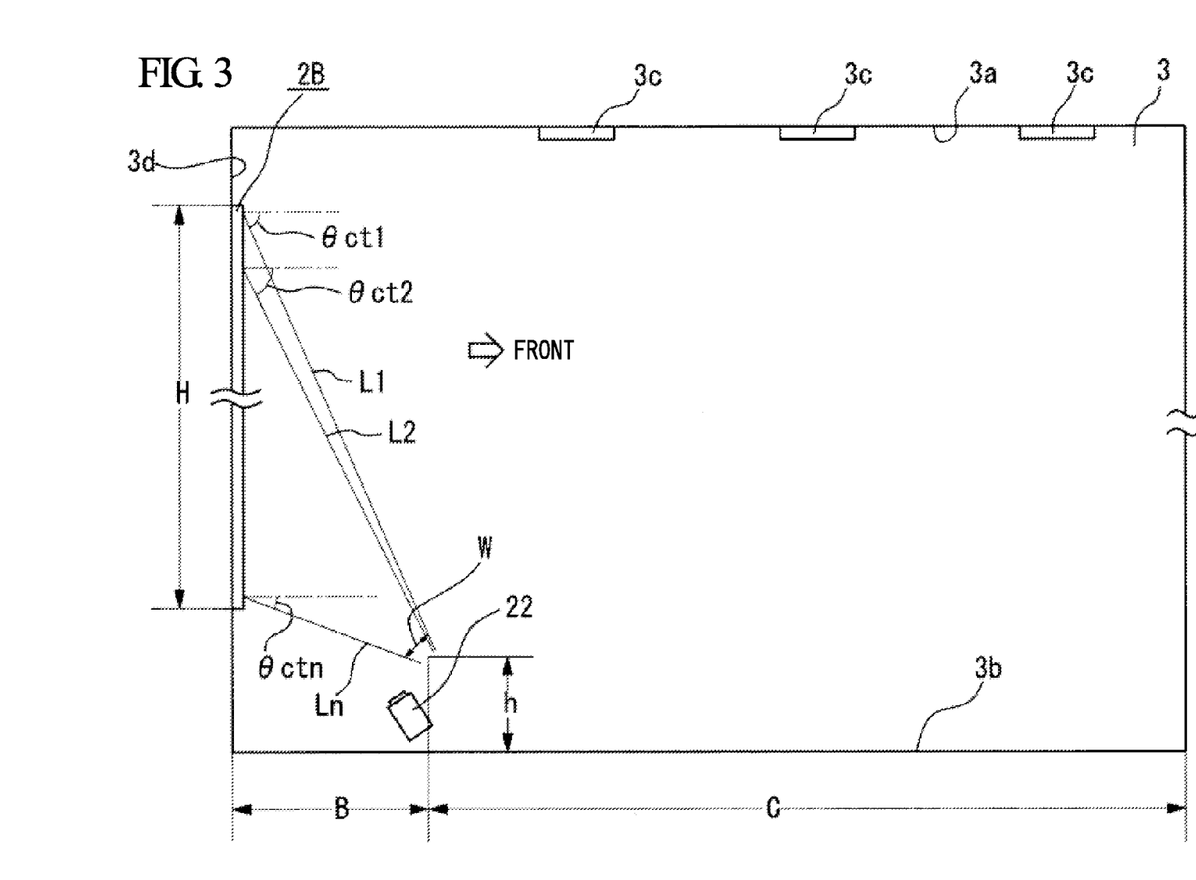
FIG. 3 is a schematic longitudinal sectional view of a reflective front screen in a room where a display device is installed, which shows a second embodiment (embodiment 2B) of the invention.

FIG. 3 is a schematic longitudinal sectional view of a reflective front screen showing a second embodiment (embodiment 2B) of the invention.

Since the present embodiment 2B is the same as the first embodiment in that the relationship of the angle θa of each area pair 12 is $\theta a1 < \theta a2 < \theta a3$, a drawing equivalent to FIG. 2 is not shown. However, the present embodiment 2B is different from the first embodiment in that the diameter W of a circle with a minimum diameter through which the virtual beam lines L1 to Ln of all area pairs 121 to 12n pass is slightly larger than 0.

Thus, the invention can also be performed in a situation where the diameter W of the circle with a minimum diameter through which the virtual beam lines L1 to Ln of all area pairs 121 to 12n pass is slightly larger than 0.

In short, if this width W is smaller than the "height H of a screen×cos θct1" described above, the effects of the invention can be achieved.

Third Embodiment

Figure 4:
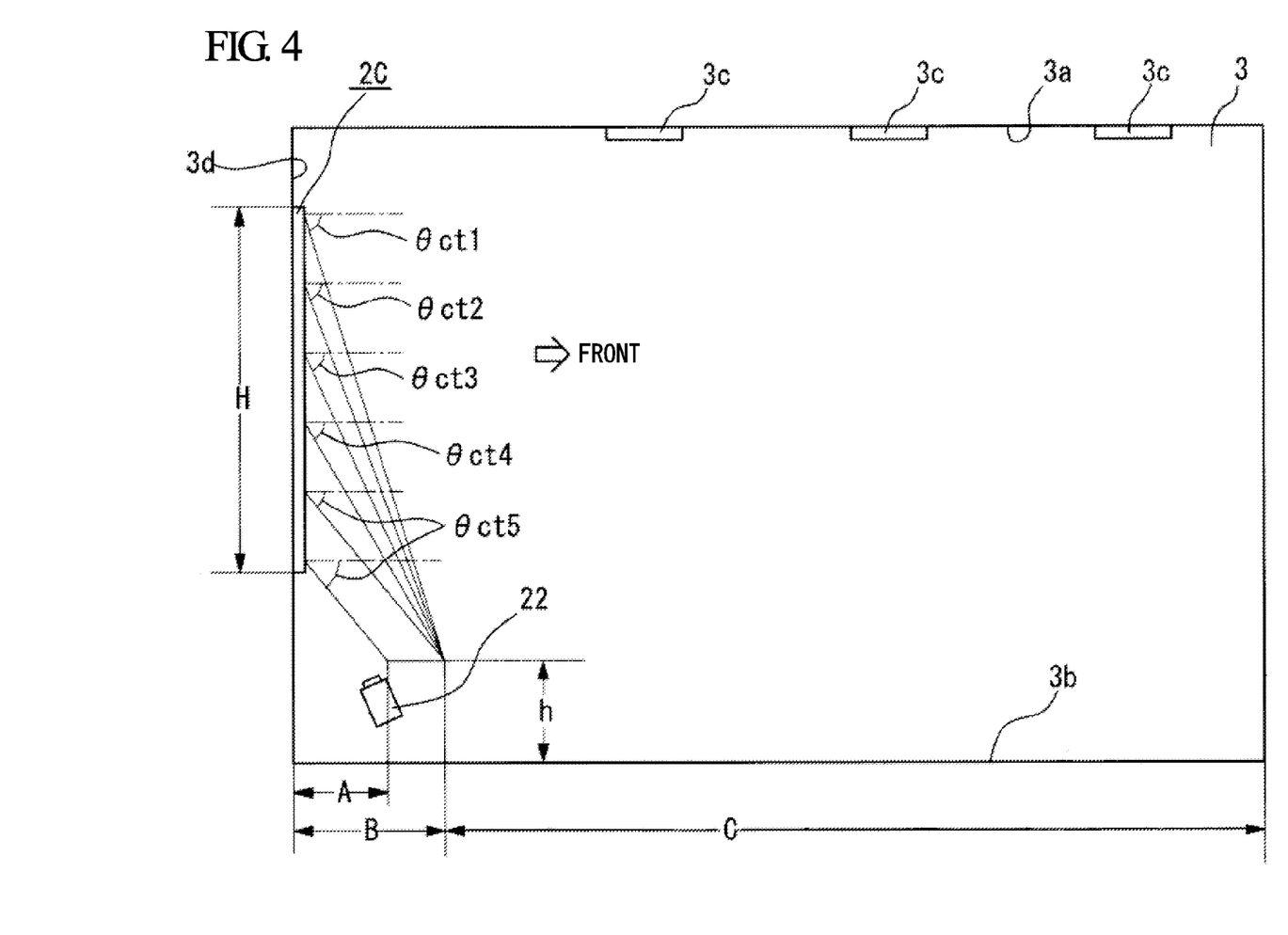
FIG. 4 is a schematic longitudinal sectional view of a reflective front screen in a room where a display device is installed, which shows a third embodiment (embodiment 2C) of the invention.

FIG. 4 is a schematic longitudinal sectional view of a reflective front screen showing a third embodiment (embodiment 2C) of the invention.

The present embodiment 2C is different from the first and second embodiments 2A and 2B in that the angle θa of each area pair 12 increases in a stepwise manner.

That is, in the first embodiment 2A shown in FIGS. 1 and 2 and the second embodiment 2B shown in FIG. 3, the angles θa of the area pairs 12 adjacent to each other are different, and the angle θa changes continuously and in a non-stepwise manner.

In the present embodiment 2C, however, a screen 2C is divided into a plurality of regions (for example, five regions) in the height direction and the angle θa in each divided region increases from the top to the bottom, as shown in FIG. 4.

Thus, as an embodiment of changing the angle θa from the top to the bottom, the angle θa may be changed in a stepwise manner.

The effects of the invention can be achieved if the diameter W of the circle with a minimum diameter through which the virtual beam lines L1 to Ln of all area pairs 121 to 12n pass is smaller than the "height H of a screen×cos θct1" described above.

The invention can be widely used for industrial applications of a reflective front screen used in a front projection display device.

While preferred embodiments of the invention have been described and illustrated above, it should be understood that these are exemplary of the invention and are not to be considered as limiting. Additions, omissions, substitutions, and other modifications can be made without departing from the spirit or scope of the present invention. Accordingly, the invention is not to be considered as being limited by the foregoing description, and is only limited by the scope of the appended claims.

What is claimed is:

1. A reflective front screen which reflects light emitted from a front projector, comprising:
   a light diffusion layer through which only light incident from a specific angular region is diffused and transmitted and through which light incident from the other angular region is transmitted straight;
   area pairs having a mirror forming area with a predetermined inclination and a non-mirror forming area with a different inclination from the predetermined inclination, the minor forming area and the non-mirror forming area being alternately disposed along a predetermined direction and being bent in a sawtooth shape;
   a light transmissive layer having a back surface, on which the area pairs are disposed, and an opposite surface to the back surface, the opposite surface being bonded to a back side of the light diffusion layer; and
   a specular reflection film which is formed on a back surface of each mirror forming area and is formed of a material with reflectivity, wherein
   an inclination of the mirror forming area with respect to a normal line of the screen close to the front projector becomes larger than the inclination of the mirror forming area far from the front projector within a cross section perpendicular to the mirror forming areas inside the screen, and
   the reflective front screen satisfies the following equation:

$$W < H \times \cos \theta ct1$$

where:
   W is a minimum diameter of a circle through which a virtual beam line, which indicates an upper boundary angle of a projector light incidence allowance angle region in all the area pairs, the projector light incidence allowance angle region being a region where the incidence of the light emitted from the front projector is allowed;
   H is a height of front screen; and
   θct1 is an upper boundary angle of the projector light incidence allowance angle region in the mirror forming area located at a farthest position among the mirror forming areas from the front projector within a cross section perpendicular to the mirror forming areas inside the screen.

2. A reflective front screen which reflects light emitted from a front projection display device, comprising:
   a light diffusion layer through which only light incident from a specific angular region is diffused and transmitted and through which light incident from the other angular region is transmitted straight; and
   a plurality of specular reflection portions formed at a position to which the light emitted from the front projection display device and transmitted through the light diffusion layer is incident, the specular reflection portion having a predetermined inclination with respect to a normal line of the screen, and the specular reflection portion being formed of a material with reflectivity, wherein
   in the specular reflection portions, an inclination of a specular reflection portion with respect to the normal line of the screen close to the display device becomes larger than the inclination of the inclination of a specular reflection portion far from the display device within a cross section perpendicular to the specular reflection portions inside the screen, and
   the reflective front screen satisfies the following equation:

$$W < H \times \cos \theta ct1$$

where:
   W is a minimum diameter of a circle through which a virtual beam line, which indicates an upper boundary angle of a projector light incidence allowance angle region in all the specular reflection portions, the projector light incidence allowance angle region being a region where the incidence of the light emitted from the display device is allowed;
   H is a height of front screen; and
   θct1 is an upper boundary angle of the projector light incidence allowance angle region in a specular reflection portion located at a farthest position among the specular reflection portions from the display device within a cross section perpendicular to the specular reflection portions inside the screen.

3. The reflective front screen according to claim 2, further comprising: a light transmissive layer having a back surface, on which a mirror forming area with a predetermined inclination is formed, and an opposite surface to the back surface, the opposite surface being bonded to a back side of the light diffusion layer,
   wherein the specular reflection portions are formed in the mirror forming area.

4. The reflective front screen according to claim 3, wherein a non-mirror forming area with a different predetermined inclination from the inclination of the mirror forming area is further formed on the back surface of the light transmissive layer.

5. The reflective front screen according to claim 4, wherein a surface on which the mirror forming area and the non mirror forming area are alternately disposed along a predetermined direction and which are bent in a sawtooth shape is formed as the back surface of the light transmissive layer.

6. The reflective front screen according to claim 2, wherein the inclination of the specular reflection portions with respect to the normal line of the screen changes continuously.

7. The reflective front screen according to claim 6, wherein virtual lines extending from all of the specular reflection portions in a direction of a light incidence allowance angle of light emitted from the display device, which is determined by the inclination of each of the specular reflection portions and a diffusion characteristic of the light diffusion layer, substantially intersect at one point.

8. The reflective front screen according to claim 6, wherein virtual lines extending from all of the specular reflection portions in a direction of a light incidence allowance angle of light emitted from the display device, which is determined by the inclination of each of the specular reflection portions and a diffusion characteristic of the light diffusion layer, pass through a point near a projection opening of the display device.

9. The reflective front screen according to claim 6, wherein a diameter of a circle with a minimum diameter through which all virtual lines extending from all of the specular reflection portions in a direction of a light incidence allowance angle of light emitted from the display device, which is determined by the inclination of each of the specular reflection portions and a diffusion characteristic of the light diffusion layer, pass is approximately 0.

10. The reflective front screen according to claim 2, wherein
the inclination of the specular reflection portions with respect to the normal line of the screen changes in a stepwise manner.

11. The reflective front screen according to claim 2, wherein
image light emitted from the display device placed diagonally on a lower front side of the screen is reflected toward a viewer located on the front side.

12. A reflective front screen which reflects light emitted from a front projection display device, comprising:
a light diffusion layer through which only light incident from a specific angular region is diffused and transmitted and through which light incident from the other angular region is transmitted straight; and
a specular reflection portions which is formed at a position where the light emitted from the front projection display device transmitted through the light diffusion layer is incident, has a predetermined inclination with respect to a normal line of the screen, and is formed of a material with reflectivity, wherein
the specular reflection portions includes a first specular reflection portion and a second specular reflection portion, the second reflection portion located closer to the display device than the first specular reflection portion within a cross section perpendicular to the specular reflection portion inside the screen, and the inclination of the second specular reflection portion with respect to the normal line of the screen is larger than the inclination of the first specular reflection portion with respect to the normal line of the screen, and
the reflective front screen satisfies the following equation:

$$W < H \times \cos \theta ct1$$

where:
W is a minimum diameter of a circle through which a virtual beam line, which indicates an upper boundary angle of a projector light incidence allowance angle region in all the specular reflection portions, the projector light incidence allowance angle region being a region where the incidence of the light emitted from the display device is allowed;
H is a height of front screen; and
$\theta ct1$ is an upper boundary angle of the projector light incidence allowance angle region in a specular reflection portion located at a farthest position among the specular reflection portions from the display device within a cross section perpendicular to the specular reflection portions inside the screen.

13. The reflective front screen according to claim 12, further comprising: a light transmissive layer having a back surface, on which a mirror forming area with a predetermined inclination is formed, and an opposite surface to the back surface, the opposite surface being bonded to a back side of the light diffusion layer,
wherein the specular reflection portions are formed in the mirror forming area.

14. The reflective front screen according to claim 13, wherein
a non mirror forming area with a different predetermined inclination from the inclination of the mirror forming area is further formed on the back surface of the light transmissive layer.

15. The reflective front screen according to claim 14, wherein
a surface on which the mirror forming area and the non mirror forming area are alternately disposed along a predetermined direction and which are bent in a sawtooth shape is formed as the back surface of the light transmissive layer.

16. The reflective front screen according to claim 12, wherein
the specular reflection portions further include a third specular reflection portions which is located closer to the display device within the cross section perpendicular to the specular reflection portions inside the screen than the first specular reflection portion, the third reflection portion is located farther from the display device within the cross section perpendicular to the specular reflection portions inside the screen than the second specular reflection portion and the inclination of the third specular reflection with respect to the normal line of the screen is larger than the inclination of the first specular reflection portion with respect to the normal line of the screen and smaller than the inclination of the second specular reflection portion with respect to the normal line of the screen.

17. The reflective front screen according to claim 16, wherein
a first virtual line extending from the first specular reflection portion in a direction of a light incidence allowance angle of light emitted from the display device that is determined by the inclination of the first specular reflection portion and a diffusion characteristic of the light diffusion layer, a second virtual line extending from the second specular reflection portion in a direction of a light incidence allowance angle of light emitted from the display device that is determined by the inclination of the second specular reflection portion and the diffusion characteristic of the light diffusion layer, and a third virtual line extending from the third specular reflection portion in a direction of a light incidence allowance angle of light emitted from the display device that is determined by the inclination of the third specular reflection portion and the diffusion characteristic of the light diffusion layer substantially intersect at one point.

18. The reflective front screen according to claim 16, wherein
a first virtual line extending from the first specular reflection portion in a direction of a light incidence allowance angle of light emitted from the display device that is determined by the inclination of the first specular reflection portion and a diffusion characteristic of the light diffusion layer, a second virtual line extending from the second specular reflection portion in a direction of a light incidence allowance angle of light emitted from the display device that is determined by the inclination of the second specular reflection portion and the diffusion characteristic of the light diffusion layer, and a third virtual line extending from the third specular reflection portion in a direction of a light incidence allowance angle of light emitted from the display device that is determined by the inclination of the third specular reflection portion and the diffusion characteristic of the light diffusion layer pass through a point near a projection opening of the display device.

19. The reflective front screen according to claim 12, wherein
the specular reflection portions further include a fourth specular reflection portion which is located closer to the display device within the cross section perpendicular to the specular reflection portions inside the screen than the first specular reflection portion, the fourth specular reflection portion is located farther from the display device than the second specular reflection portion within the cross section perpendicular to the specular reflection portions inside the screen and the inclination of the fourth specular reflection portion with respect to the normal line of the screen is equal to the inclination of the second specular reflection portion with respect to the normal line of the screen.

20. The reflective front screen according to claim 12, wherein
image light emitted from the display device placed diagonally on a lower front side of the screen is reflected toward a viewer located on the front side.

* * * * *

UNITED STATES PATENT AND TRADEMARK OFFICE
CERTIFICATE OF CORRECTION

PATENT NO.        : 8,654,442 B2
APPLICATION NO.   : 13/450051
DATED             : February 18, 2014
INVENTOR(S)       : Uchida et al.

It is certified that error appears in the above-identified patent and that said Letters Patent is hereby corrected as shown below:

Title page, Item 73. Assignee, insert the following additional assignee
--Tohoku University, Sendai-Shi, Miyagi-Ken, (JP)--

Signed and Sealed this
Tenth Day of November, 2015

Michelle K. Lee
*Director of the United States Patent and Trademark Office*